United States Patent Office 3,398,161
Patented Aug. 20, 1968

3,398,161
(2 - HYDROXY - 3 - AMINOPROPOXY)BENZO(B)
THIOPHEN DERIVATIVES WHICH HAVE β-
ADRENERGIC BLOCKING ACTIVITY
Ralph William Turner, Macclesfield, England, assignor to
Imperial Chemical Industries Limited, London, England, a corporation of Great Britain
No Drawing. Filed May 23, 1966, Ser. No. 551,876
Claims priority, application Great Britain, June 30, 1965,
27,723/65
4 Claims. (Cl. 260—330.5)

ABSTRACT OF THE DISCLOSURE (2-hydroxy-3-aminopropoxy)benzo(b)thiophen derivatives, for example 4 - (2 - hydroxy - 3 - isopropylaminopropoxy)benzo(b)thiophen, which have β-adrenergic blocking activity. The compounds are made by interaction of the appropriate halohydrin or epoxide with an amine.

---

This invention relates to new heterocyclic derivatives which possess useful biological properties.

According to the invention we provide benzo(b)thiophen derivatives of the formula:

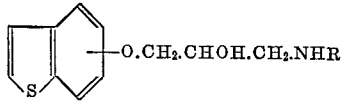

wherein R stands for an alkyl, cycloalkyl or alkenyl radical, and the pharmaceutically-acceptable acid-addition salts thereof.

It is to be understood that the above definition encompasses all possible stereoisomeric forms of the said benzo(b)thiophen derivatives.

As a suitable value for R there may be mentioned, for example, an alkyl, cycloalkyl or alkenyl radical of not more than 6 carbon atoms, for example the n-propyl, isopropyl, t-butyl, cyclopentyl or allyl radical.

Specific heterocyclic derivatives of the invention are, for example, 4-(2-hydroxy - 3 - isopropylaminopropoxy) benzo(b)thiophen, 4-(2-hydroxy-3-t-butylaminopropoxy) benzo(b)thiophen, 4-(3 - cyclopentylamino - 2 - hydroxypropoxy)benzo(b)thiophen, 5-(2-hydroxy - 3 - isopropylaminopropoxy)benzo(b)thiophen, 5 - (2 - hydroxy - 3 - n-propylaminopropoxy)benzo(b)thiophen and 5 - (3 - allylamino - 2 - hydroxypropoxy)benzo(b)thiophen, and the pharmaceutically-acceptable acid-addition salts thereof.

As suitable acid-addition salts there may be mentioned salts derived from inorganic acids affording pharmaceutically-acceptable anions, for example hydrochlorides, phosphates or sulphates, and salts derived from organic acids affording pharmaceutically-acceptable anions, for example oxalates, lactates, tartrates, acetates, salicylates or citrates.

According to a further feature of the invention we provide a process for the manufacture of the benzo(b) thiophen derivatives of the invention which comprises the interaction of a compound of the formula:

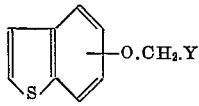

wherein Y stands for the group: —CHOH·CH₂X or

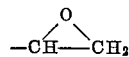

wherein X stands for a halogen atom, with an amine of the formula NH₂R, wherein R has the meaning stated above.

As a suitable value for X there may be mentioned, for example, a chlorine or bromine atom. The interaction may optionally be carried out in a solvent or diluent, for example ethanol, and it may conveniently be accelerated or completed by the application of heat.

The starting materials of the formula:

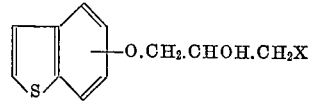

wherein X has the meaning stated above, may be obtained by heating together a compound of the formula:

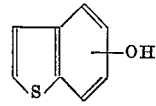

and the appropriate epihalohydrin and piperidine.

The starting materials of the formula:

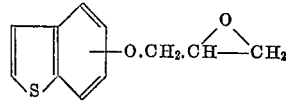

may be obtained by the interaction of a compound of the formula:

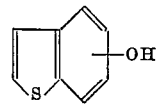

and epichlorohydrin and sodium hydroxide in a diluent or solvent, for example aqueous dioxan, at ambient temperature.

According to a further feature of the invention we provide pharmaceutical compositions comprising as active ingredient(s) at least one of the benzo(b)thiophen derivatives of the invention, or a pharmaceutically-acceptable acid-addition salt thereof, together with a pharmaceutically-acceptable diluent or carrier.

The pharmaceutical compositions may be obtained by conventional means using conventional excipients. As suitable compositions there may be mentioned, for example, tablets, capsules, aqueous or non-aqueous solutions, aqueous or non-aqueous suspensions, emulsions, injectable aqueous or non-aqueous solutions or suspensions, and dispersible powders.

The benzo(b)thiophen derivatives of this invention have β-adrenergic blocking properties in standard experimental animals (cats). These experimental animals and the testing procedure used for determining the β-adrenergic blocking properties are standard in the art and presumptively indicate utility in man. It is therefore reasonable to assume that said benzo(b)thiophen derivatives will be of value for the treatment or prophylaxis in man of hypertension, phaeochromocytoma, and heart diseases, for example angina pectoris, cardiac arrhythmias and coronary insufficiency.

The invention is illustrated but not limited by the following examples in which the parts are by weight:

Example 1.—A mixture of 8 parts of 4-hydroxybenzo (b)thiophen, 200 parts of epichlorohydrin and 1 part of piperidine is heated under reflux for 4 hours. The mixture is then evaporated under reduced pressure, the residue is dissolved in ethyl acetate, and the solution is dried. The solution is then evaporated to leave a residue [comprising 4 - (3 - chloro - 2-hydroxypropoxy)benzo(b) thiophen] which is mixed with 200 parts of isopropylamine. The mixture is heated in a sealed vessel at 100° C. for 10 hours. The solution is then evaporated, and the residue is shaken with a mixture of 2 N-sodium hydroxide solution and ethyl acetate. The ethyl acetate layer is separated, and is extracted with 2 portions of 200 parts of 2 N-hydrochloric acid. The aqueous extracts are combined, basified with 2 N-sodium hydroxide solution, and extracted with ethyl acetate. The ethyl acetate layer is separated, dried and evaporated. The residue is crystallised from petroleum ether (B.P. 60–80° C.), and there is thus obtained 4-(2-hydroxy-3-isopropylaminopropoxy) benzo(b)thiophen, M.P. 85° C.

Example 2.—The process described in Example 1 is repeated except that a mixture of 105 parts of t-butylamine and 140 parts of methanol replaces the 200 parts of isopropylamine. There is thus obtained 4-(2-hydroxy-3 - t - butylaminopropoxy)benzo(b)thiophen, M.P. 115–116° C.

Example 3.—A mixture of 1 part of 4 - (3 - chloro-2-hydroxypropoxy)benzo(b)thiophen and 25 parts of isopropylamine is heated in a sealed vessel at 110° C. for 12 hours. The resultant solution is evaporated and the residue is shaken with 2 N-sodium hydroxide solution and ethyl acetate. The organic phase is separated, dried and evaporated. The residue is crystallised from petroleum ether (B.P. 60–80° C.), and there is thus obtained 4-(2 - hydroxy - 3 - isopropylaminopropoxy)benzo(b)thiophen, M.P. 85° C.

The 4 - (3 - chloro - 2 - hydroxypropoxy)benzo(b) thiophen used as starting material may be obtained in the following manner:

A mixture of 8 parts of 4 - hydroxybenzo(b)thiophen, 40 parts of epichlorohydrin and 1 part of piperidine is heated under reflux for 4 hours. The excess epichlorohydrin is then evaporated in vacuo, and the resultant oil is shaken with a mixture of N-sodium hydroxide solution and ethyl acetate. The organic phase is separated, dried, and evaporated. There is thus obtained 4 - (3 - chloro-2-hydroxypropoxy)benzo(b)thiophen.

Example 4.—The procedure described in Example 3 is repeated except that 20 parts of t-butylamine are used instead of 25 parts of isopropylamine. There is thus obtained 4 - (2-hydroxy-3-t-butylaminopropoxy)benzo(b) thiophen, M.P. 115–116° C.

Example 5.—1 part of 4 - (2,3 - epoxypropoxy)benzo (b)thiophen, 15 parts of cyclopentylamine and 20 parts of methanol are refluxed for 5 hours. The resultant solution is evaporated and the residue is shaken with 2 N-hydrochloric acid and ether. The aqueous phase is separated, neutralised with 2 N-sodium hydroxide solution, and the resultant emulsion is extracted with 100 parts of ether. The ethereal extract is dried and evaporated. The residue is crystallised from petroleum ether (B.P. 80–100° C.), and there is thus obtained 4-(3-cyclopentylamino - 2-hydroxypropoxy)benzo(b)thiophen, M.P. 96–98° C.

The 4 - (2,3 - epoxypropoxy)benzo(b)thiophen used as starting material may be obtained in the following manner:

To a mixture of 15 parts of 4-hydroxybenzo(b)thiophen and 9 parts of epichlorohydrin there is added a solution of 5 parts of sodium hydroxide in 500 parts of water and 50 parts of dioxan. The resultant mixture is stirred at ambient temperature for 9 hours. The resultant solution is then extracted twice, each time with 300 parts of ethyl acetate. The combined extracts are dried and evaporated. There is thus obtained 4-(2,3-epoxypropoxy)benzo (b)thiophen.

Example 6.—A mixture of 9 parts of 5 - (3 - chloro-2-hydroxypropoxy)benzo(b)thiophen, 200 parts of isopropylamine and 150 parts of methanol is heated in a sealed vessel at 110° C. for 12 hours. The resultant solution is evaporated, and the residue is shaken with 2 N-sodium hydroxide solution and ethyl acetate. The ethyl acetate layer is separated, dried and evaporated. The residue is crystallised from petroleum ether (B.P. 80–100° C.), and there is thus obtained 5 - ( 2 -hydroxy - 3 - isopropylaminopropoxy)benzo(b)thiophen, M.P. 117° C.

The 5 - (3 - chloro - 2 - hydroxypropoxy)benzo(b) thiophen use as starting material may be obtained in the following manner:

7 parts of 5-hydroxybenzo(b)thiophen, 50 parts of epichlorohydrin and 1 part of piperidine are heated together at 100° C. for 8 hours. The excess of epichlorohydrin is removed in vacuo and the resultant oil is shaken with 2 N-sodium hydroxide solution and ethyl acetate. The ethyl acetate layer is separated, dried and evaporated. The residue consists of 5 - (3 - chloro - 2 - hydroxypropoxy) benzo(b)thiophen.

Example 7.—The procedure described in Example 6 is repeated except that 300 parts of n-propylamine are used instead of 200 parts of isopropylamine. The residue is crystallised from petroleum ether (B.P. 60–80° C.) and there is thus obtained 5 - (2 - hydroxy - 3 - n - propylaminopropoxy)benzo(b)thiophen, M.P. 104° C.

Example 8.—The procedure described in Example 6 is repeated except that 300 parts of allylamine are used instead of 200 parts of isopropylamine. The resultant oil is converted into its oxalate by conventional means, and the oxalate is crystallised from n-butyl acetate. There is thus obtained 5 - (3 - allylamino - 2 - hydroxypropoxy) benzo(b)thiophen hydrogen oxalate, M.P. 166–168° C.

What I claim is:

1. A compound selected from the group consisting of benzo(b)thiophen derivatives of the formula:

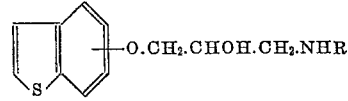

wherein R is selected from the group consisting of alkyl of not more than 6 carbon atoms, cycloalkyl of not more than 6 carbon atoms and wherein the 2 - hydroxy - 3-amino-propoxy group substitutes the 4- or 5-position of the benzo(b)thiophen nucleus, and alkenyl of not more than 6 carbon atoms, and the pharmaceutically-acceptable acid-addition salts thereof.

2. A compound as claimed in claim 1 which is selected from the group consisting of 4 - (2 - hydroxy - 3 - isopropylaminopropoxy(benzo(b)thiophen and the pharmaceutically-acceptable acid-addition salts thereof.

3. A compound as claimed in claim 1 which is selected from the group consisting of 4 - (2 - hydroxy-3-t-butylaminopropoxy)-benzo(b)thiophen and the pharmaceutically-acceptable acid-addition salts thereof.

4. A compound as claimed in claim 1 which is selected from the group consisting of 5 - (2 - hydroxy - 3 - isopropylaminopropoxy)benzo(b)thiophen and the pharmaceutically-acceptable acid-addition salts thereof.

References Cited

Gilman et al., JACS 47:245:54 (1925).
Alles, et al., J. Pharm & Expt. Therap 72:265 (1941).
Ing et al., J. Pharm. Pharmacol 4:21–6 (1952).

HENRY R. JILES, *Primary Examiner.*

C. M. SHURKO, *Assistant Examiner.*